(12) United States Patent
Haman (10) Patent No.: US 7,102,320 B1
(45) Date of Patent: Sep. 5, 2006

(54) HALF-BRIDGE CONTROL CIRCUIT (75) Inventor: Daniel J. Haman, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/069,701

(22) Filed: Mar. 1, 2005

(51) Int. Cl.
H02P 27/04 (2006.01)

(52) U.S. Cl. .................. 318/800; 318/801; 318/439

(58) Field of Classification Search ............... 318/800, 318/293, 291, 292, 280, 287, 801, 439
See application file for complete search history.

(56) References Cited

U.S. PATENT DOCUMENTS

| | | | |
|---|---|---|---|
| 4,145,642 A | 3/1979 | Kosaka et al. | 318/331 |
| 4,290,000 A | 9/1981 | Sun | 318/566 |
| 4,477,752 A | 10/1984 | Nakano et al. | 318/331 |
| 5,020,126 A | 5/1991 | Tabourier | 388/815 |
| 5,032,772 A * | 7/1991 | Gully et al. | 318/135 |
| 5,034,875 A | 7/1991 | Hattori | 363/60 |
| 5,469,096 A * | 11/1995 | Nessi et al. | 327/112 |
| 5,532,562 A | 7/1996 | Yasuda | 318/439 |
| 5,637,971 A * | 6/1997 | Pratt | 318/599 |
| 5,767,653 A * | 6/1998 | DeFiore et al. | 318/811 |
| 6,078,154 A * | 6/2000 | Manlove et al. | 318/293 |
| 6,430,067 B1 | 8/2002 | Lee | 363/60 |
| 6,452,349 B1 * | 9/2002 | Hahn et al. | 318/254 |
| 6,515,443 B1 * | 2/2003 | Kelly et al. | 318/599 |
| 6,518,723 B1 | 2/2003 | Oku | 318/801 |
| 6,542,324 B1 * | 4/2003 | Galbiati et al. | 360/75 |
| 6,646,507 B1 * | 11/2003 | Prokin et al. | 330/251 |
| 6,664,750 B1 | 12/2003 | Pelonis | 318/439 |
| 6,836,103 B1 * | 12/2004 | Brooks et al. | 323/282 |
| 6,841,903 B1 * | 1/2005 | Boscolo et al. | 310/68 B |
| 6,898,091 B1 * | 5/2005 | Van Bodegraven et al. | 363/21.02 |
| 6,975,083 B1 * | 12/2005 | Flock | 318/254 |
| 6,979,966 B1 * | 12/2005 | Barrenscheen et al. | 318/254 |
| 2004/0119429 A1 * | 6/2004 | Flock | 318/254 |
| 2004/0212356 A1 * | 10/2004 | Dowlatabadi | 323/282 |
| 2005/0127886 A1 * | 6/2005 | Sase et al. | 323/282 |

* cited by examiner

Primary Examiner—Rita Leykin (57) ABSTRACT

A circuit is configured to detect an output state of a first half-bridge circuit and to generate a first signal and a second signal based on the output state to reproduce the output state at an output of a second half-bridge circuit.

34 Claims, 3 Drawing Sheets

FIG. 1

| OUTPUT STATE | C1 | C2 | SWITCH 120 | SWITCH 122 | OUTPUT 128 | C3 | C4 | SWITCH 130 | SWITCH 132 | OUTPUT 138 |
|---|---|---|---|---|---|---|---|---|---|---|
| 1ST | HIGH | LOW | ON | OFF | V1 | HIGH | LOW | ON | OFF | V2 |
| 2ND | LOW | HIGH | OFF | ON | GND | LOW | HIGH | OFF | ON | GND |
| 3RD | LOW | LOW | OFF | OFF | (V1)/2 | LOW | LOW | OFF | OFF | HIGH Z |

HALF-BRIDGE CONTROL CIRCUIT

BACKGROUND

Control applications, such as electric motor control applications, utilize control circuitry that includes robust control feature sets. Various integrated control circuits are available which incorporate extensive control feature sets in a small, inexpensive package for driving a load, such as an electric motor. The power output specifications for these ICs are typically limited in order to maintain the small and inexpensive package while providing the extensive control feature set. For control applications with power usage which exceeds the power output specifications of these ICs, the small and inexpensive IC is typically replaced with a control circuit built from discrete components, which may significantly increase the size and cost of the control circuit.

DETAILED DESCRIPTION

Figure 1:
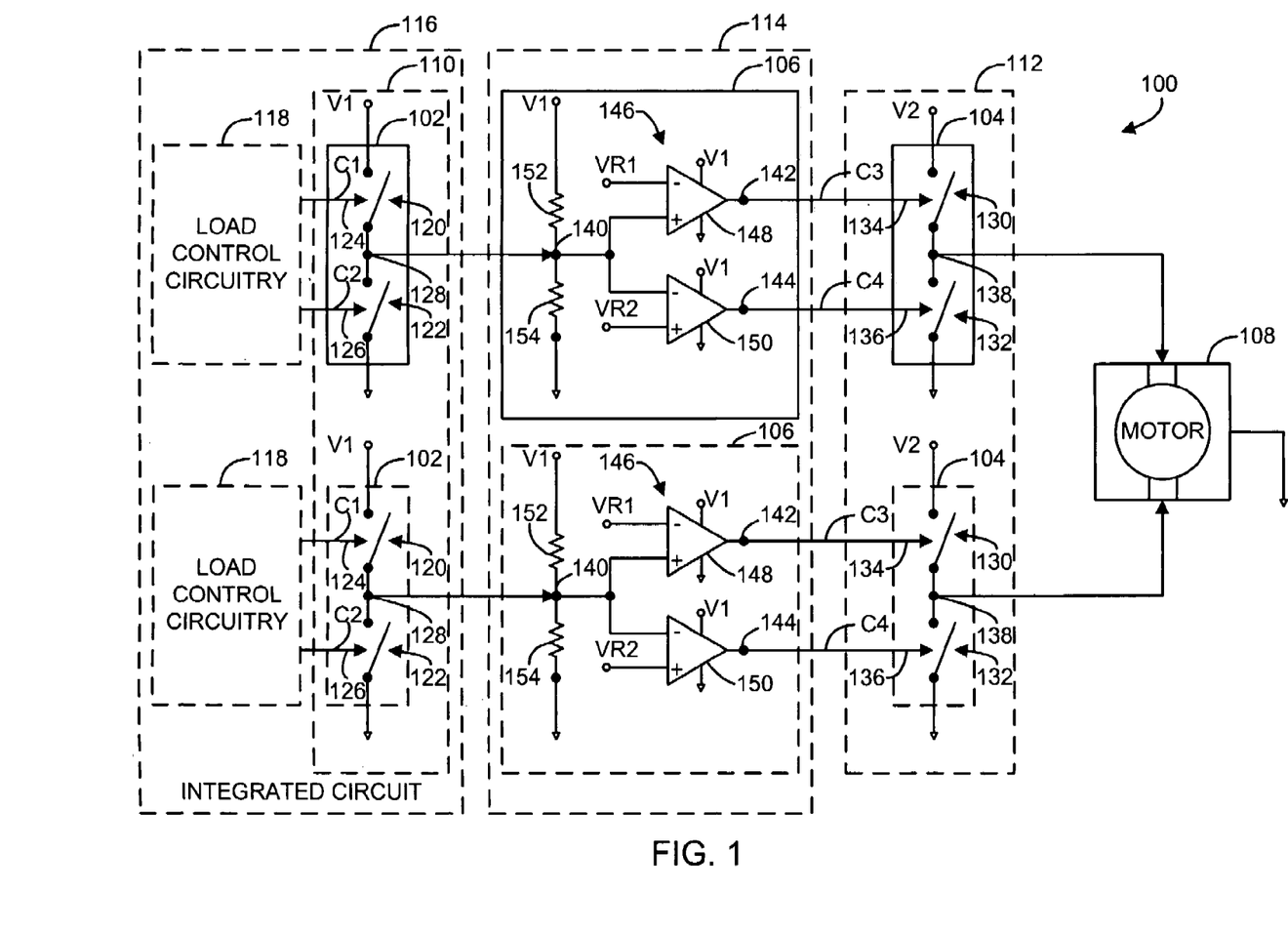
FIG. 1 is a diagram schematically illustrating an embodiment of a system including an interface device for use with a half-bridge or full H-bridge circuit according to an exemplary embodiment.

FIG. 1 illustrates an embodiment of a system, system 100, for applying power to a load including an interface for use with a half-bridge or full H-bridge circuit according to an exemplary embodiment. System 100 includes a half-bridge circuit 102, a half-bridge circuit 104, and an interface device 106. System 100 is also configured to be coupled to a load 108, illustrated as an electric motor (e.g., a bipolar winding of a brushless DC motor) in FIG. 1. System 100 is generally configured to apply power to a load using a half-bridge or full H-bridge circuit. More specifically, when configured to operate as a half-bridge, system 100 is configured to detect an output state of a power output terminal of half-bridge circuit 102 and to provide input signals to half-bridge circuit 104 such that half-bridge circuit 104 reproduces the output state of half-bridge circuit 102. Half-bridge circuit 104 may provide power to load 108 at a level higher than the power output level of half-bridge circuit 102.

System 100 may utilize one of several possible configurations. For example, according to an exemplary embodiment system 100 may have a half-bridge configuration including a single half-bridge circuit 102, a single half-bridge circuit 104 coupled to load 108, and a single interface device 106. According to another exemplary embodiment, system 100 is an H-bridge configuration including two half-bridge circuits 102, two half-bridge circuits 104 each coupled to load 108, and two interface devices 106, wherein each pair of half-bridge circuits 102 and 104 are configured as H-bridge circuits 110 and 112. In this embodiment, each pair of H-bridge circuits 110 and 112 are composed of separately constructed half-bridge circuits, or alternatively, are integrally constructed as H-bridge circuits 110 and 112. In this embodiment, each pair of interface devices 106 are also composed of separately constructed interface devices 106 or alternatively, are integrally constructed as a single device 114.

According to various exemplary embodiments, each half-bridge circuit 102 is included as part of a device 116, such as an integrated circuit, which further includes control circuitry 118, such as load control circuitry configured to provide a number of control feature sets. For example, according to an exemplary embodiment, each half-bridge circuit 102 may be a low power half-bridge circuit included as part of an integrated motor control circuit. In embodiments where each half-bridge circuit 102 is included as part of an integrated circuit, each half-bridge circuit 102 may have a low peak voltage output of less than approximately fifty-five volts and/or a peak current output of less than approximately three amperes.

Each half-bridge circuit 102 and 104 functions as an independent half-bridge circuit, or alternatively, in conjunction with another respective half-bridge circuit 102 or 104 as a full H-bridge circuit 110 or 112. In embodiments where two respective half-bridge circuits 102 or 104 are combined as a full H-bridge circuit 110 or 112, the two half-bridge circuits 102 or 104 are configured to function together to control the output of power to an interconnected device, such as load 108. Accordingly, while the operation of half-bridge circuits 102 and 104 within system 100 is primarily described herein with reference to an independent half-bridge circuit, it should be understood that full H-bridge circuits are also contemplated.

Half-bridge circuit 102 includes switches 120 and 122, control inputs 124 and 126, and a power output terminal 128. Switches 120 and 122 are transistors or another electronic device, such as a metal-insulator-metal (M/M) device, configured to block (stop the flow of electric current except for such things as leakage current) the flow of electric current (i.e., to "open" or switch "OFF") or permit the flow of electric current (i.e., to "close" or switch "ON") in response to signals at control inputs 124 and 126 respectively. Switches 120 and 122 are connected in series. Switch 120 is coupled to control input 124, to a supply voltage V1 (e.g., to the positive voltage terminal of a DC voltage source), and to power output terminal 128. Switch 122 is coupled to control input 126, to output terminal 128 and to another voltage different from V1, such as a lower positive voltage, a negative voltage, or a ground reference as illustrated in FIG. 1.

Control inputs 124 and 126 are configured to independently control the operation of switches 120 and 122 respectively. According to an exemplary embodiment, control inputs 124 and 126 provide independent control signals C1 and C2 to switches 120 and 122 respectively such that half-bridge circuit 102 is configured to generate a pulse width modulated output signal at power output terminal 128. In this embodiment, a logical "high" signal (e.g., a digital logic "1") at control input 124 or 126 indicates that the corresponding switch 120 or 122 is to be switched "ON" or "closed" to permit the flow of electric current through the switch. A logical "low" signal (e.g., a digital logic "0") at control input 124 or 126 indicates that the corresponding switch 120 or 122 is to be switched "OFF" or "open" to block the flow of electric current through the switch.

Three permissible combinations of control signals C1 and C2 at control inputs 124 and 126 exist where control inputs 124 and 126 provide independent control signals C1 and C2 to respective switches 120 and 122, resulting in three possible output states for power output terminal 128. A first possible output state exists when C1 is a logical "high"

signal at control input 124 and C2 is a logical "low" signal at control input 126. In this output state, switch 120 is "ON" or "closed" to permit the flow of electric current through switch 120, and switch 122 is "OFF" or "open" to block the flow of electric current through switch 122. Power output terminal 128 is switched to supply voltage V1 in this output state such that half-bridge circuit 102 is configured to permit the flow of electric current from power output terminal 128 to a connected device.

A second possible output state exists when C1 is a logical "low" signal at control input 124, and C2 is a logical "high" signal at control input 126. In this output state, switch 120 is "OFF" or "open" to block the flow of electric current through switch 120, and switch 122 is "ON" or "closed" to permit the flow of electric current through switch 122. Power output terminal 128 is switched to ground (or a lower positive voltage or a negative voltage) in this output state such that half-bridge circuit 102 is configured to permit the flow of electric current into power output terminal 128 from a connected device.

A third possible output state exists when C1 is a logical "low" signal at control input 124, and C2 is also a logical "low" signal at control input 126. In this output state, switches 120 and 122 are "OFF" or "open" to block the flow of electric current through switches 120 and 122. Power output terminal 128 is in a state of high impedance in this output state such that half-bridge circuit 102 is configured to block the flow of electric current between power output terminal 128 and a connected device.

Half-bridge circuit 104 is similar to half-bridge circuit 102, except that half-bridge circuit 104 may be configured to provide a higher amount of output power than half-bridge circuit 102 (e.g., a higher peak output voltage and/or current). Half-bridge circuit 104 includes switches 130 and 132, control inputs 134 and 136, and a power output terminal 138. Switches 130 and 132 are transistors or another electronic device, such as an M/M device, configured to block the flow of electric current (i.e., to "open" or switch "OFF") or permit the flow of electric current (i.e., to "close" or switch "ON") in response to signals at control inputs 134 and 136. Switches 130 and 132 are connected in series. Switch 130 is coupled to control input 134, to a supply voltage V2 (e.g., to the positive voltage terminal of a DC voltage source) configured to provide a higher peak output voltage than V1, and to power output terminal 138. Switch 132 is coupled to control input 136, to power output terminal 138 and to another voltage different from V2, such as a lower positive voltage, a negative voltage, or a ground reference as illustrated in FIG. 1.

Control inputs 134 and 136 are configured to independently control the operation of switches 130 and 132 respectively. According to an exemplary embodiment, control inputs 134 and 136 provide independent control signals C3 and C4 to switches 130 and 132, respectively, such that half-bridge circuit 104 is configured to generate a pulse width modulated output signal at power output terminal 138. In this embodiment, a logical "high" signal (e.g., a digital logic "1") at control input 134 or 136 indicates that the corresponding switch 130 or 132 is to be switched "ON" or "closed" to permit the flow of electric current through the switch. A logical "low" signal (e.g., a digital logic "0") at control input 134 or 136 indicates that the corresponding switch 130 or 132 is to be switched "OFF" or "open" to block the flow of electric current through the switch.

As with half-bridge circuit 102, three permissible combinations of control signals C3 and C4 at control inputs 134 and 136 exist where control inputs 134 and 136 provide independent control signals C3 and C4 to respective switches 130 and 132, resulting in three possible output states for power output terminal 138. A first possible output state exists when C3 is a logical "high" signal at control input 134, and C4 is a logical "low" signal at control input 136. In this output state, switch 130 is "ON" or "closed" to permit the flow of electric current through switch 130, and switch 132 is "OFF" or "open" to block the flow of electric current through switch 122. Power output terminal 138 is switched to supply voltage V2 in this output state such that half-bridge circuit 104 is configured to permit the flow of electric current from power output terminal 138 to load 108.

A second possible output state exists when C3 is a logical "low" signal at control input 134, and C4 is a logical "high" signal at control input 136. In this output state, switch 130 is "OFF" or "open" to block the flow of electric current through switch 130, and switch 132 is "ON" or "closed" to permit the flow of electric current through switch 132. Power output terminal 138 is switched to ground (or a lower positive voltage or a negative voltage) in this output state such that half-bridge circuit 104 is configured to permit the flow of electric current into power output terminal 138 from load 108.

A third possible output state exists when C3 is a logical "low" signal at control input 134, and C4 is also a logical "low" signal at control input 136. In this output state, switches 130 and 132 are "OFF" or "open" to block the flow of electric current through switches 130 and 132. Power output terminal 138 is in a state of high impedance in this output state such that half-bridge circuit 104 is configured to block the flow of electric current between power output terminal 138 and load 108.

Interface device 106 is coupled to half bridge circuits 102 and 104. Interface device 106 includes an input node 140, output nodes 142 and 144, and translator circuit 146. Interface device 106 is generally configured to detect the output state of power output terminal 128 of half-bridge circuit 102 at input node 140. Interface device 106 is also generally configured to provide control signals C3 and C4 to control inputs 134 and 136 of half-bridge circuit 104 based on the detected output state of power output terminal 128 such that half-bridge circuit 104 reproduces the output state of power output terminal 128 of half-bridge circuit 102 at power output terminal 138. According to an exemplary embodiment, interface device 106 is configured to detect the three possible output states for output terminal 128 that exist where control inputs 124 and 126 provide independent control signals C1 and C2 to respective switches 120 and 122, and to provide control signals C3 and C4 to control inputs 134 and 136 of half-bridge circuit 104 based on the detected output state.

Input node 140 is coupled to power output terminal 128 of half-bridge circuit 102 and is configured to provide a voltage to translator circuit 146 that is representative of the output state of power output terminal 128. Output nodes 142 and 144 are coupled to control inputs 134 and 136 of half-bridge circuit 104 so that they provide control signals C3 and C4 to control inputs 134 and 136 of half-bridge circuit 104.

Translator circuit 146 is coupled to input node 140 and output nodes 142 and 144. In the illustrated embodiment, translator circuit 146 includes voltage comparator circuits 148 and 150, and resistors 152 and 154. Translator circuit 146 is configured to detect the output state of power output terminal 128 of half-bridge circuit 102 at input node 140 based on the voltage provided at input node 140, and to generate control signals C3 and C4 at output nodes 142 and 144 based on the detected output state of power output terminal 128. According to an exemplary embodiment, translator circuit 146 is configured to detect the three possible output states for output terminal 128 that exist where control inputs 124 and 126 provide independent control signals C1 and C2 to respective switches 120 and 122, and to generate control signals C3 and C4 at output nodes 142 and 144 based on the detected output state of power output terminal 128.

Voltage comparator circuit 148 is coupled to input node 140 at a non-inverting input, to a reference voltage VR1 at an inverting input, and to output node 142. Voltage comparator circuit 150 is coupled to input node 140 at an inverting input, to a reference voltage VR2 at a non-inverting input, and to output node 144. Voltage comparator circuits 148 and 150 are designed such that each circuit is capable of switching at a rate which exceeds that of power output terminals 128 and 138 of half-bridge circuits 102 and 104 respectively.

Reference voltage VR1 is selected to be a voltage lower than V1, but higher than reference voltage VR2, such that voltage ranges exist between V1 and VR1, between VR1 and VR2, and between VR2 and ground. According to an exemplary embodiment, reference voltage VR1 is approximately seventy-five percent of V1 and reference voltage VR2 is approximately twenty-five percent of V1. Voltage comparator circuit 148 is configured to generate control signal C3 at output node 142 based on the voltage provided at input node 140. If the voltage at input node 140 is greater than VR1, comparator circuit 148 generates a logical "high" signal for control signal C3 at output node 142, and if the voltage at input node 140 is less than VR1, comparator circuit 148 generates a logical "low" signal for control signal C3 at output node 142. Voltage comparator circuit 150 is configured to generate control signal C4 at output node 144 based on the voltage provided at input node 140. If the voltage at input node 140 is greater than VR2, comparator circuit 150 generates a logical "low" signal for control signal C4 at output node 144, and if the voltage at input node 140 is less than VR2, comparator circuit 150 generates a logical "high" signal for control signal C4 at output node 144.

Resistor 152 is coupled between V1 and input node 140. Resistor 154 is coupled between input node 140 and ground. The sizes of resistors 152 and 154 are selected such that the output state of power output node 128 is represented by a suitable corresponding voltage with respect to reference voltages VR1 and VR2 to give the desired state at output node 142 and output node 144. According to various exemplary embodiments, the sizes of resistors 152 and 154 are selected such that one of the three possible output states for output terminal 128 that exist where control inputs 124 and 126 provide independent control signals C1 and C2 to respective switches 120 and 122 is represented by a voltage greater than VR1, another of the three output states is represented by a voltage less than VR2, and another of the three output states is represented by a voltage less than VR1 and greater than VR2. For example, according an exemplary embodiment, VR1 is approximately seventy-five percent of V1 and VR2 is approximately twenty-five percent of V1, and resistors 152 and 154 are sized approximately equally. In this embodiment, when the first possible output state exists at power output terminal 128, input node 140 is at supply voltage V1, which is higher than reference voltage VR1. When the second possible output state exists at power output terminal 128, input node 140 is at ground, which is lower than reference voltage VR2. When the third possible output state exists at power output terminal 128, power output terminal 128 is in a state of high impedance and resistors 152 and 154 function as a voltage divider such that input node 140 is at approximately one-half V1, which is less than VR1 and greater than VR2.

Figure 2:
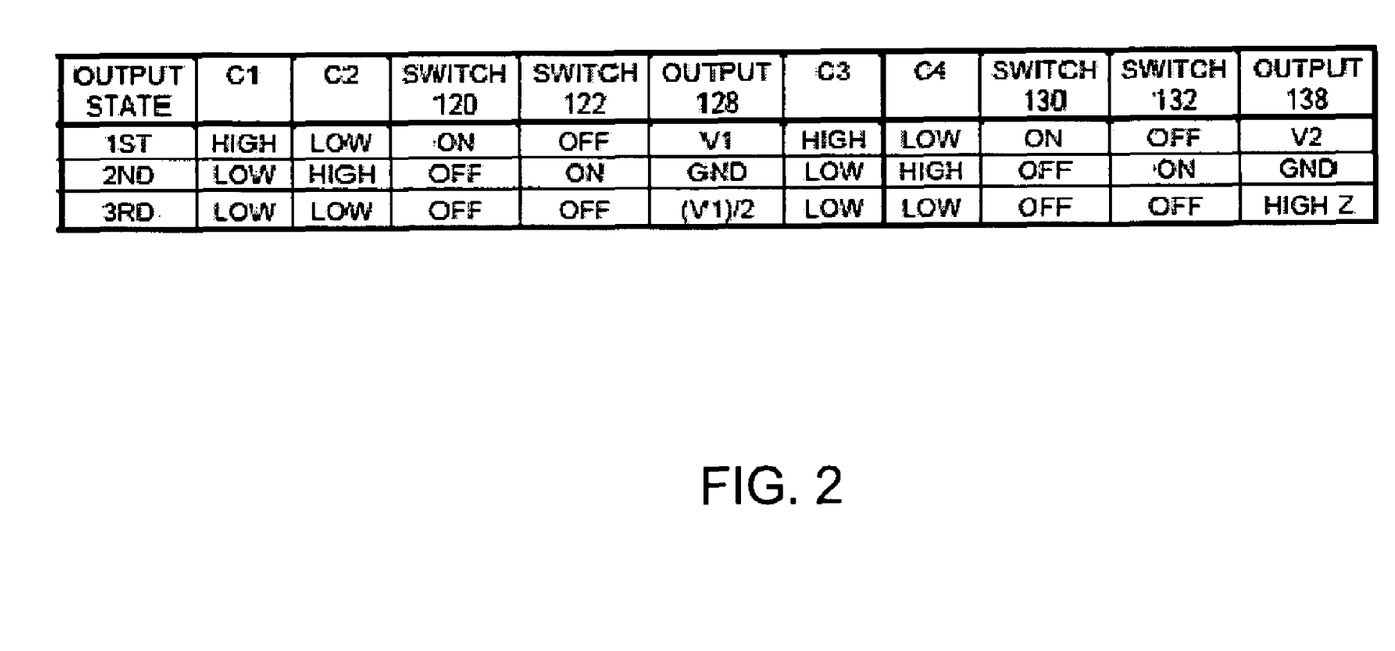
FIG. 2 is a table summarizing the operational conditions present throughout the embodiment of the system for each of three possible output states according to an exemplary embodiment.

FIG. 2 is a table summarizing the operational conditions present throughout system 100 for each of the three possible output states at power output terminal 128 according to an exemplary embodiment. Referring to FIGS. 1 and 2, the operation of interface device 106 within system 100 will now be described. When the first permissible output state exists at power output terminal 128, control signal C1 is a logical "high" signal at control input 124, and control signal C2 is a logical "low" signal at control input 126. In this output state, switch 120 is "ON," and switch 122 is "OFF." Power output terminal 128 is switched to supply voltage V1 in this output state, such that half-bridge circuit 102 is configured to permit the flow of electric current from power output terminal 128. Input node 140 is at supply voltage V1, which is greater than reference voltage VR1. Accordingly, voltage comparator circuit 148 generates a logical "high" signal for control signal C3 at output node 142, and voltage comparator circuit 150 generates a logical "low" signal for control signal C4 at output node 144 such that control input 134 provides a logical "high" signal and control input 136 provides a logical "low" signal. Switch 130 is "ON," and switch 132 is "OFF." Power output terminal 138 is switched to supply voltage V2 in this output state such that half-bridge circuit 104 is configured to permit the flow of current from power output terminal 138 to load 108, but at a higher power output level (i.e., voltage V2 and/or the resulting higher current flow to load 108) than half-bridge circuit 102 is configured to provide.

When the second permissible output state exists at power output terminal 128, control signal C1 is a logical "low" signal at control input 124, and control signal C2 is a logical "high" signal at control input 126. In this output state, switch 120 is "OFF," and switch 122 is "ON." Power output terminal 128 is switched to ground in this output state, such that half-bridge circuit 102 is configured to permit the flow of electric current into power output terminal 128. Input node 140 is at ground, which is less than reference voltage VR2. Accordingly, voltage comparator circuit 148 generates a logical "low" signal for control signal C3 at node 142, and voltage comparator circuit 150 generates a logical "high" signal for control signal C4 at output node 144 such that control input 134 provides a logical "low" signal and control input 136 provides a logical "high" signal. Switch 130 is "OFF," and switch 132 is "ON." Power output terminal 138 is switched to ground in this output state such that half-bridge circuit 104 is configured to permit the flow of electric current into power output terminal 138 from load 108, but at a higher power output level than half-bridge circuit 102 is configured to provide.

When the third permissible output state exists at power output terminal 128, control signal C1 is a logical "low" signal at control input 124, and control signal C2 is also a logical "low" signal at control input 126. In this output state, switch 120 is "OFF," and switch 122 is "OFF." Power output terminal 128 is in a state of high impedance in this output state such that half-bridge circuit 102 is configured to block the flow of current between power output terminal 128 and a connected device. Input node 140 is at a voltage of one-half V1, which is less than reference voltage VR1 and greater than reference voltage VR2. Accordingly, voltage comparator circuit 148 generates a logical "low" signal for control signal C3 at output node 142, and voltage comparator circuit 150 generates a logical "low" signal for control signal C4 at output node 144 such that control input 134 provides a logical "low" signal and control input 136 also provides a logical "low" signal. Switch 130 is "OFF," and switch 132 is "OFF." Power output terminal 138 is in a state of high impedance in this output state such that half-bridge circuit 104 is configured to block the flow of electric current between power output terminal 138 and load 108.

Figure 3:
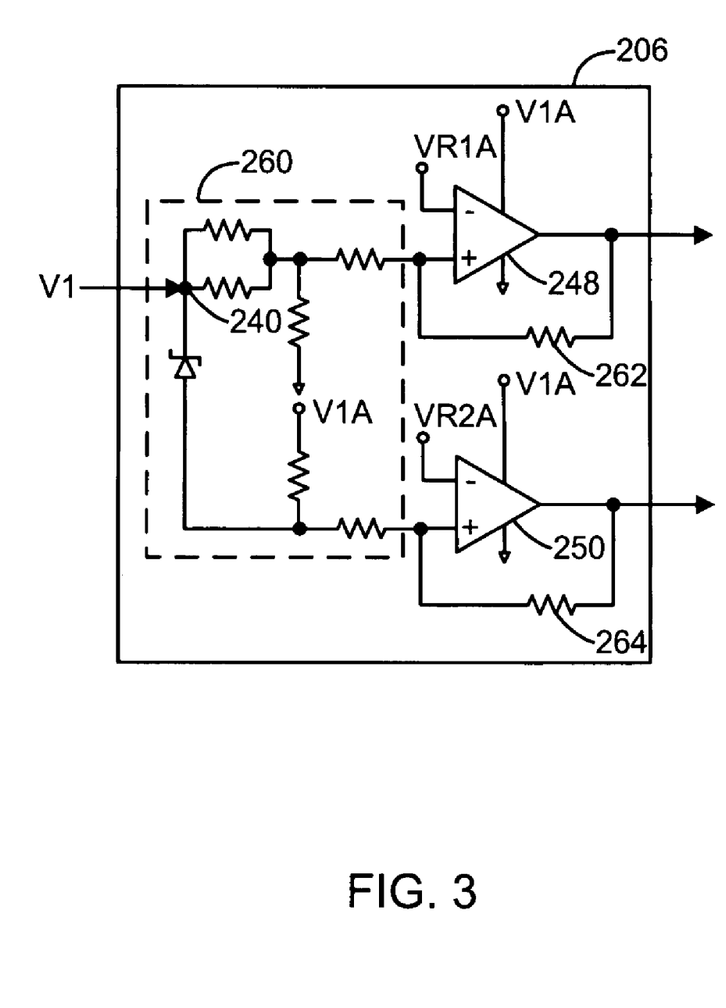
FIG. 3 is a diagram schematically illustrating an embodiment of an interface device for use with a half-bridge or full H-bridge circuit according to another exemplary embodiment.

FIG. 3 illustrates an interface device 206 for use with a half-bridge or full H-bridge circuit according to another exemplary embodiment. Interface device 206 is similar to interface device 106 in structure and function, except that interface device 206 includes a voltage reduction circuit 260 coupled between an input node 240 and voltage comparator circuits 248 and 250 rather than resistors 152 and 154, and also includes feedback resistors 262 and 264. Voltage reduction circuit 260 includes a network of resistors coupled between input node 240 and voltage comparator circuits 248 and 250. Voltage reduction circuit 260 is configured to reduce the peak voltage level at the inputs to voltage comparator circuits 248 and 250 from V1 at input node 240 such that lower voltage components powered by a voltage V1A (where voltage V1A is lower than voltage V1) may be used within interface device 206 (e.g., voltage comparators designed for use with a five volt or lower supply voltage). Feedback resistors 262 and 264 provide for faster and more precise switching in voltage comparator circuits 248 and 250.

The use of interface device 106 or 206 allows a half-bridge or full H-bridge circuit having a lower power output specification, such as a half-bridge or full H-bridge output of an integrated control circuit, to be used for higher power control applications. Higher power DC motors, for example, may be driven and controlled using available motor control integrated circuits that have a small and inexpensive package that is easy to implement, that include extensive control feature sets, and that are industry-proven.

It should be understood that these embodiments are offered by way of example only. Many modifications are possible without departing from the subject matter recited in the claims. Unless specifically otherwise noted, the claims reciting a single particular element also encompass a plurality of such particular elements. Accordingly, all such modifications are intended to be included within the scope of the devices and methods described herein. The order and sequence of any process or method steps may be varied or re-sequenced according to other embodiments. Other substitutions, modifications, changes, and omissions may be made without departing from the spirit and scope of the devices and methods described herein.

What is claimed is:

1. An apparatus, comprising:
   a circuit configured to detect an output state of a first half-bridge circuit rated to switch a first level of power and to generate a first signal and a second signal based on the output state to reproduce the output state at an output of a second half-bridge circuit rated to switch a second level of power greater than the first level of the power.

2. The apparatus of claim 1, wherein the output state is a first output state, and wherein the circuit is configured to detect one of the first output state, a second output state, and a third output state of the first half-bridge circuit, and to generate the first signal and the second signal to reproduce one of the first, second, and third output states at the output of the second half-bridge circuit.

3. The apparatus of claim 2, wherein the first output state is configured to permit flow of electric current from the output of the second half-bridge circuit, wherein the second output state is configured to permit flow of electrical current into the output of the second half-bridge circuit, and wherein the third output state is configured to block flow of electrical current from or into the output of the second half-bridge circuit.

4. The apparatus of claim 2, wherein the circuit is configured to detect one of the first, second, and third output states based on the presence of a respective one of a first, a second, and a third voltage at an input node.

5. The apparatus of claim 1, wherein the circuit is a first circuit, and wherein the apparatus further comprises:
   a second circuit configured to detect an output state of a third half-bridge circuit and to generate a third signal and a fourth signal based on the output state of the third half-bridge circuit to reproduce the output state of the third half-bridge circuit at an output of a fourth half-bridge circuit;
   wherein the first and third half-bridge circuits comprise a first H-bridge circuit, and wherein the second and fourth half-bridge circuits comprise a second H-bridge circuit.

6. The apparatus of claim 5, wherein the first H-bridge circuit is rated to switch a first level of power, and wherein the second H-bridge circuit is rated to switch a second level of power greater than the first level.

7. The apparatus of claim 1, wherein the circuit comprises:
   a first voltage comparator circuit coupled to an input node, and to a first reference voltage; and
   a second voltage comparator circuit coupled to the input node, and to a second reference voltage.

8. The apparatus of claim 7, wherein the circuit further comprises:
   a first resistor coupled between the input node and a supply voltage node; and
   a second resistor coupled between the input node and a ground.

9. The apparatus of claim 7, wherein the circuit further comprises:
   a voltage reduction circuit coupled between the input node and the first and second voltage comparator circuits.

10. An interface device, comprising:
    first and second output nodes configured to be coupled to respective control inputs of a first half-bridge circuit configured to provide power at a first level;
    an input node configured to be coupled to a power output of a second half-bridge circuit configured to provide power at a second level greater than the first level;
    a first voltage comparator circuit coupled to the first output node, the input node, and to a first reference voltage; and
    a second voltage comparator circuit coupled to the second output node, the input node, and to a second reference voltage.

11. The interface device of claim 10, wherein the second reference voltage is lower than the first reference voltage.

12. The interface device of claim 11, wherein the first and second voltage comparator circuits are configured to detect one of a first output state, a second output state, and a third output state of the power output of the second half-ridge circuit based on the presence of a respective one of a first, second, and a third voltage at the input node.

13. The interface device of claim 12, wherein the first voltage is higher than the first reference voltage, the second voltage is lower than the second reference voltage, and the third voltage is lower than the first reference voltage and higher than the second reference voltage.

14. The interface device of claim 10, further comprising:
a first resistor coupled between the input node and a supply voltage node; and
a second resistor coupled between the input node and a ground.

15. The interface device of claim 10, further comprising:
a voltage reduction circuit coupled between the input node and the first and second voltage comparator circuits.

16. The interface device of claim 10, wherein the input node is a first input node, and wherein the interface device further comprises:
third and fourth output nodes configured to be coupled to respective control inputs of a third hall-bridge circuit, wherein the first and third half-bridge circuits comprise a first H-bridge circuit;
a second input node configured to be coupled to a power output of a fourth half-bridge circuit; wherein the second and fourth half-bridge circuits comprise a second H-bridge circuit;
a third voltage comparator circuit coupled to the third output node, to the second input node, and to the first reference voltage; and
a fourth voltage comparator circuit coupled to the fourth output node, to the second input node, and to the second reference voltage.

17. An interface device, comprising:
an input node configured to be coupled to an output of a lower power half-bridge circuit; and
means for detecting one of a first output state, a second output state, and a third output state of the output of the lower power half-bridge circuit at the input node, and for generating first and second output signals based on the detected one of the first, second, and third output states to reproduce the one of the first output state, the second output state, and the third output state detected at the output of the lower power half-bridge circuit at an output of a higher power half-bridge circuit configured to provide greater output power than the lower power half-bridge circuit.

18. The interface device of claim 17, wherein the means for detecting is configured to detect one of the first, second, and third output states based on the presence of a respective one of a first, a second, and a third voltage at the input node.

19. The interface device of claim 17, wherein the first output state is configured to permit flow of electrical current from the outputs of the lower power and the higher power half-bridge circuits, wherein the second output state is configured to permit flow of electrical current into the outputs of the lower power and the higher power half-bridge circuits, and wherein the third output state is configured to block flow of electrical current from or into the outputs of the lower power and the higher power half-bridge circuits.

20. The interface device of claim 17, wherein the lower power half-bridge circuit is a first lower power half bridge circuit, wherein the input node is a first input node, and wherein the apparatus further comprises:
a second input node configured to be coupled to an output of a second lower power half-bridge circuit, wherein the first and second lower power half-bridge circuits comprise an H-bridge circuit; and
means for detecting one of a first output state, a second output state, and a third output state of the output of the second lower power half-bridge circuit at the second input node, and for generating third and fourth output signals based on the detected one of the first, second, and third output states of the output of the second lower power half-bridge circuit.

21. An interface device, comprising:
first and second output nodes;
an input node configured to be coupled to a power output terminal of a first half-bridge circuit configured to provide power at a first level; and
a translator circuit configured to detect one of a first output state, a second output state, and a third output state of the output terminal of the first half-bridge circuit at the input node, and to generate first and second signals at the first and second output nodes based on the detected one of the first, second, and third output states to reproduce the one of the first output state, the second output state, and the third output state at an output terminal of a second half-bridge circuit configured to provide power at a second level greater than the first level.

22. A system, comprising:
a first half-ridge circuit configured to provide power at a first level;
a second half-bridge circuit configured to provide power at a second level greater than the first level; and
an interface device configured to detect an output state of the first half-bridge circuit and to provide signals to the second half-bridge circuit to reproduce the output state of the first half-bridge circuit at an output of the second half-bridge circuit.

23. The system of claim 22, further comprising load control circuitry coupled to the first half-bridge circuit, wherein the load control circuitry and the first half-bridge circuit are integral as a single integrated circuit.

24. The system of claim 22, wherein the output state is a first output state, and wherein the interface device is configured to detect one of the first output state, a second output state, and a third output state of the first half-bridge circuit, and to provide the signals to the second half-bridge circuit in response to the detected one of the first, second, and third outputs states to reproduce the detected one of the first output state, the second output state, and the third output state at the output of the second half-bridge circuit.

25. The system of claim 24, wherein the first output state permits flow of electrical current from the output of the second half-bridge circuit, wherein the second output state permits flow of electrical current into the output of the second half-bridge circuit, and wherein the third output state blocks flow of electrical current to or from the output of the second half-bridge circuit.

26. The system of claim 22, wherein the interface device is a first interface device, and wherein the system further comprises:
a third half-bridge circuit configured to provide power at the first level, wherein the first and third half-bridge circuits comprise a first H-bridge circuit; a fourth half-bridge circuit configured to provide power at the second level, wherein the second and fourth half-bridge circuits comprise a second H-bridge circuit; and
a second interface device configured to detect an output state of the third half-bridge circuit and to provide signals to the fourth half-bridge circuit to reproduce the output state of the third half-bridge circuit at an output of the fourth half-bridge circuit.

27. The system of claim 22, wherein the second half-bridge circuit is configured to provide power to a DC motor.

28. A method, comprising:
  detecting an output state of an output of a lower power half-bridge circuit;
  generating first and second signals based on the detected output state; and
  providing the first and second signals to respective inputs of a higher power half-bridge circuit, configured to provide greater output power than the lower power half-bridge circuit, to reproduce the output state at an output of the higher power half-bridge circuit.

29. The method of claim 28, wherein detecting the output state comprises:
  detecting one of a first output state, a second output state, and a third output state of the lower power half-bridge circuit;
  wherein generating the first and second signals comprises:
  generating the first and second signals based on the detected one of the first, second, and third output states; and
  wherein providing the first and second signals comprises:
  providing the first and second signals to reproduce one of the first, second, and third output states at the output of the higher power half-bridge circuit.

30. The method of claim 29, wherein the first output state is configured to permit flow of electrical current from the outputs of the lower power and higher power half-bridge circuits;
  wherein the second output state is configured to permit flow of electrical current into the outputs of the lower power and higher power half-bridge circuits; and
  wherein the third output state is configured to block flow of electrical current from or into the outputs of the lower power and higher power half-bridge circuits.

31. The method of claim 29, wherein detecting one of the first, second, and third output states comprises:
  detecting the presence of a respective one of a first, a second, and a third voltage at the output of the lower power half-bridge circuit.

32. The method of claim 28, wherein detecting the output state and
  generating the first and second signals comprises:
  detecting the output state and generating the first and second signals using first and second voltage comparator circuits.

33. The method of claim 32, wherein detecting the output state further comprises:
  reducing a voltage level of the output of the lower power half-bridge circuit using a voltage reduction circuit.

34. The method of claim 28, wherein the lower power half-bridge circuit is a first lower power half bridge circuit and the higher power half-bridge circuit is a first higher power half-bridge circuit, and wherein the method further comprises:
  detecting an output state of an output of a second lower power half-bridge circuit, wherein the first and second lower power half-bridge circuits comprise a first lower power H-bridge circuit;
  generating third and fourth signals based on the detected output state of the output of the second lower power half-bridge circuit; and
  providing the third and fourth signals to respective inputs of the second higher power half-bridge circuit to reproduce the output state of the output of the second lower power half-bridge circuit at an output of the second higher power half-bridge circuit.

* * * * *

UNITED STATES PATENT AND TRADEMARK OFFICE
CERTIFICATE OF CORRECTION

| | |
|---|---|
| PATENT NO. | : 7,102,320 B1 |
| APPLICATION NO. | : 11/069701 |
| DATED | : September 5, 2006 |
| INVENTOR(S) | : Daniel J. Haman |

It is certified that error appears in the above-identified patent and that said Letters Patent is hereby corrected as shown below:

In column 8, line 62, in Claim 12, delete "half-ridge" and insert -- half-bridge --, therefor.

In column 9, line 16, in Claim 16, delete "hall-bridge" and insert -- half-bridge --, therefor.

In column 10, line 21, in Claim 22, delete "half-ridge" and insert -- half-bridge --, therefor.

Signed and Sealed this

Sixth Day of July, 2010

David J. Kappos
*Director of the United States Patent and Trademark Office*